Nov. 5, 1935.  J. W. LEIGHTON  2,020,149
DRAG LINK
Filed Dec. 19, 1932  2 Sheets-Sheet 1
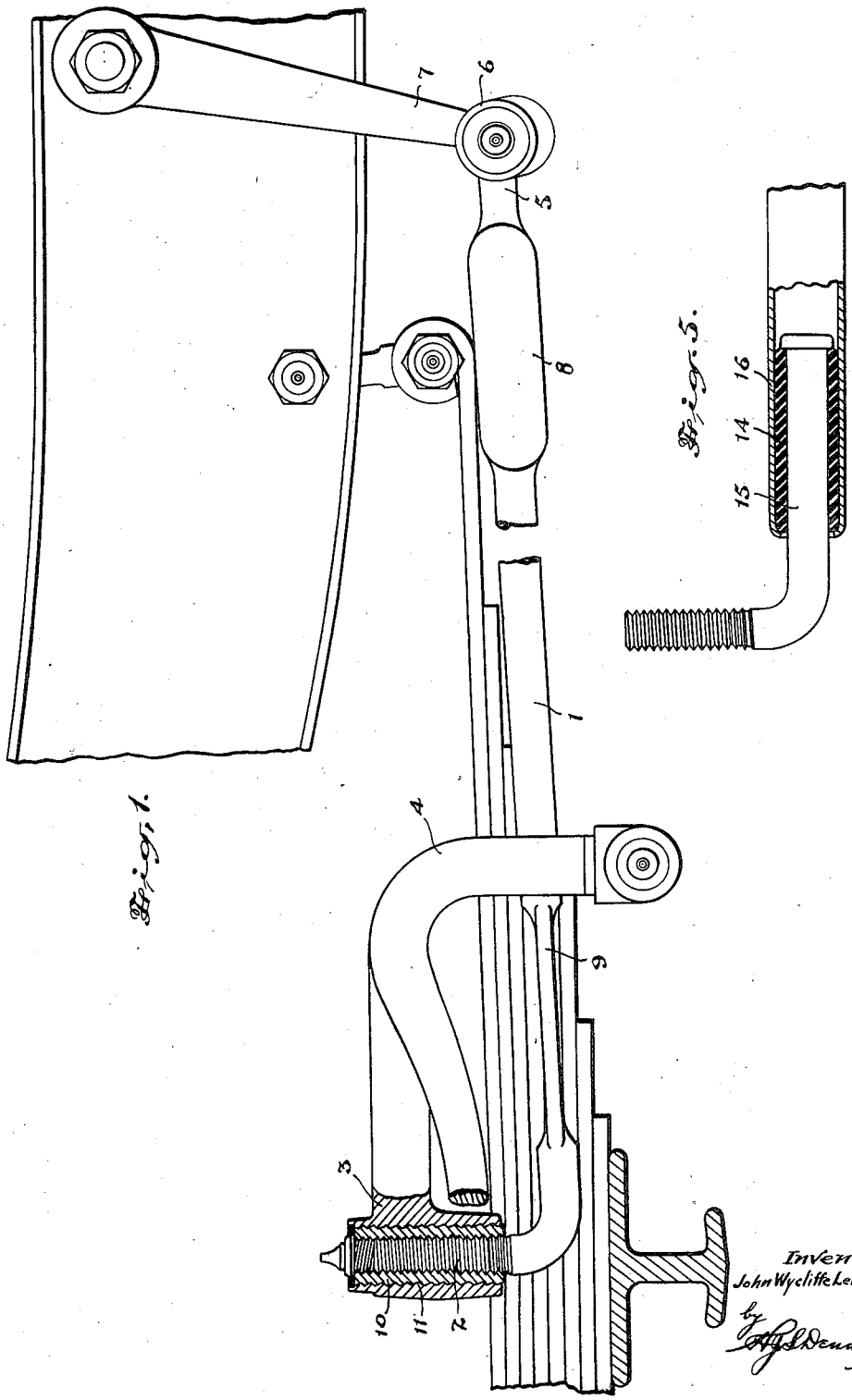
Inventor:
John Wycliffe Leighton

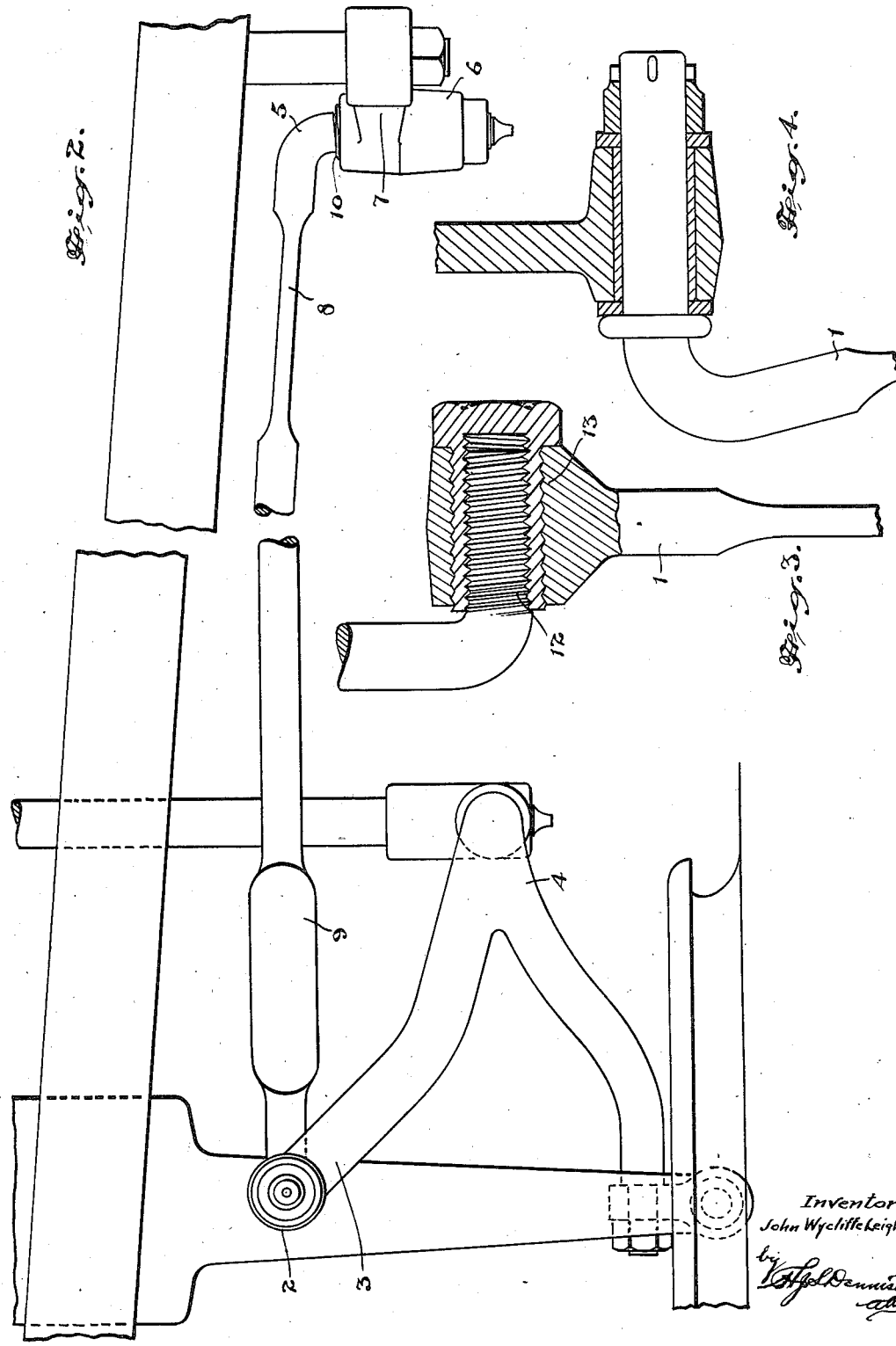

Patented Nov. 5, 1935

2,020,149

UNITED STATES PATENT OFFICE 2,020,149

DRAG LINK

John Wycliffe Leighton, Port Huron, Mich.

Application December 19, 1932, Serial No. 647,989

4 Claims. (Cl. 74—581)

The principal objects of the invention are, to overcome the difficulties met with in properly aligning the bearing ends of steering gear drag links and similar rods used in motor car construction, providing a construction of link or arm, capable of withstanding the stresses of use, but having such flexibility as will permit of slight flexures in accordance with variation of movement of said arm or link.

A further and important object is to effect a material reduction in cost while retaining a structure of great dependability.

A still further object is to effect a reduction in the number of working joints in a steering mechanism.

The principal feature of the invention consists in the novel construction of a steering gear drag link or of a shock absorber arm, whereby flexibility is imparted to the link or arm by deforming the cross section of same to form a broader and thinner sectional area.

In the accompanying drawings, Figure 1 is a side elevational view of a drag link constructed in accordance with this invention.

Figure 2 is a plan view of the structure illustrated in Figure 1.

Figure 3 is an enlarged longitudinal sectional detail showing the preferred form of bearing connection between the drag link and the operating member connected therewith.

Figure 4 is an enlarged sectional detail showing a modified form of connection between the drag link and the connected operating member.

Figure 5 is a detail of a further modification showing a flexible rubber insert.

In the ordinary construction of steering gear drag links it is customary to provide ball and socket joints at both ends thereof in order to permit the links to swing to accommodate the compound movement that is necessary, that is to say, the link in operation is required to swing vertically and also to move to a slight degree laterally, consequently a universal joint is required between the steering arm and the drag link at one end and the knuckle lever operating the wheel at the other end.

According to the present invention the drag link 1 is formed of a length of steel rod of a suitable diameter having one of its ends 2 bent in a substantially right angular direction to extend in a substantially vertical plane and to be supported in a rotatable bearing in the end 3 of the steering lever 4.

The other end of the rod 1 is bent substantially at right angles and in a plane at right angles to the axis of the end 2, that is to say, in a horizontal direction.

The end 5 has a journal bearing in the journal end 6 of the knuckle lever 7. Adjacent to the laterally turned end of the link 1, the rod is deformed by being pressed so that the metal is flattened out for a distance of several inches forming a comparatively thin blade portion 8 the broad surfaces of which are arranged in a substantially vertical plane right angularly disposed to the adjacent horizontally disposed bearing end 5 of the rod.

Adjacent to the other end of the drag link the metal is flattened out horizontally for several inches in the length to form a blade section 9, the flat faces of which are arranged in a substantially horizontal disposition and substantially in right angular relation to the blade portion 8 and to the adjacent vertically disposed bearing end 2.

The rod is constructed of a quality of steel which will be capable of tempering so as to effectively withstand the strains to which it is subjected and also to resist fatigue, and the cross sectional thickness of the blade portion is such as to enable the rod flexing sufficiently to accommodate the variations in movement which will occur in its use which are not absorbed in the ordinary swinging bearing at the ends.

It is preferred to provide a threaded bearing surface on the bearing ends 2 and 5 of the drag link and these are shown threaded to engage the threaded inner surface of the bearing bushings 10 which are secured in the ends of the steering lever 4 and knuckle lever 7 respectively.

The bushings 10 are preferably threaded on their outer walls with a locking thread 11 of the same pitch as the inner bearing thread, but the angularity of the thread surfaces is such that when the bushings are driven home they lock securely in position.

It may be found desirable to form the steering lever with a laterally turned end 12 as is shown in Figure 3 and such end is threaded to engage the threaded bushing which is threaded into the cylindrical end 13 of the drag link.

It may also be found desirable to utilize the flexible construction of drag link with a plain journal bearing at the ends as is illustrated in Figure 4.

The invention is herein shown as applied to a drag link but it will be readily apparent that the lever arms of shock absorbers or tie rods may be similarly constructed to advantage.

In Figure 5 a rubber sleeve 14 is compressed between the telescoped portions 15 and 16.

What I claim as my invention is:—

1. An improved drag link for motor vehicles, comprising a steel bar having laterally turned journal ends arranged in substantial right angular relation the one to the other, said bar having a flattened plane portion arranged adjacent to each of the ends and in substantially right angular relation to each other, said flattened portions being capable of withstanding the stresses of use and being free to flex.

2. An improved drag link for motor vehicles, comprising a rod having a journal bearing at each end thereof provided with threaded bearing surfaces, said journals being substantially at right angles the one to the other, threaded bearing members engaging said threaded journal ends in threaded bearing contact, said rod having its cross sectional shape deformed at points adjacent to its ends forming flexible blade portions arranged substantially in right angular relation to each other.

3. A connecting link for motor vehicles having angularly disposed threaded bearing surfaces at the ends, said bearing surfaces being substantially at right angles the one to the other, said link being composed of a length of rod having one end flat and disposed in a plane at right angles to the axis of the adjacent threaded bearing surface and having the other end flat and disposed in a plane substantially in right angular relation to the axis of the adjacent other threaded bearing surface.

4. A connecting link for motor car steering mechanism formed entirely from a length of high quality bar stock capable of being forged, hardened and tempered, said bar having its body metal deformed into flexible flattened blade form for a portion of its length adjacent the end leaving a non-flattened integral bar extension therebeyond, said bar extension being turned laterally intermediate of its length in substantial right angular relation to the plane of disposition of said flattened blade portion and presenting a journal bearing surface.

JOHN WYCLIFFE LEIGHTON.